US005248887A

United States Patent [19]

Oberhardt

[11] Patent Number: 5,248,887

[45] Date of Patent: Sep. 28, 1993

[54] METHOD OF AND APPARATUS FOR DETERMINING THE ORIENTATION OF FILM

[75] Inventor: Knut Oberhardt, Föching, Fed. Rep. of Germany

[73] Assignee: AGFA-Gevaert Aktiengesellschaft, Leverkusen, Fed. Rep. of Germany

[21] Appl. No.: 879,248

[22] Filed: May 1, 1992

[30] Foreign Application Priority Data

May 2, 1991 [DE] Fed. Rep. of Germany ....... 4114343

[51] Int. Cl.[5] .......... G01N 21/86

[52] U.S. Cl. .......... 250/548; 355/41

[58] Field of Search .......... 250/568, 570, 548, 557; 235/463; 353/26 A, 26 R; 355/77, 41

[56] References Cited

U.S. PATENT DOCUMENTS 4,961,086 10/1990 Takanaka .......... 355/41

4,965,628 10/1990 Olliver et al. .......... 355/41

FOREIGN PATENT DOCUMENTS 0331048 8/1989 European Pat. Off. .

0331049 9/1989 European Pat. Off. .

3635386 4/1987 Fed. Rep. of Germany .

*Primary Examiner*—David C. Nelms

*Assistant Examiner*—K. Shami

*Attorney, Agent, or Firm*—Peter K. Kontler

[57] ABSTRACT

A length of exposed film has a timing track which extends along one of the longitudinal margins thereof. The timing track includes a begin segment having a first width, an end segment having a different second width and a grating between the segments. The grating consists of alternating light and dark segments having a uniform width different from the widths of the begin and end segments. The two longitudinal margins of the film are scanned by respective sensors as the film advances towards a film processing apparatus. Whenever a segment passes by a sensor, the width of the segment and its position in the timing track are recorded. Since the widths of the begin and end segments differ from the width of the grating segments, the position of the begin or end segment relative to the grating can be established. This information, combined with a knowledge of which sensor detected the timing track, makes it possible to determine the orientation of the film.

24 Claims, 2 Drawing Sheets

METHOD OF AND APPARATUS FOR DETERMINING THE ORIENTATION OF FILM

BACKGROUND OF THE INVENTION

The invention relates generally to the determination of the orientation of an exposed length of photosensitive material, e.g., photographic film.

More particularly, the invention relates to the determination of the orientation of an exposed length of photosensitive material having a timing track on one of its longitudinal margins The timing track includes a begin mark, a finish mark different from the begin mark, and a regular light/dark grating, i.e., a grating consisting of alternating light and dark bars of uniform width, between the marks.

Determination of the orientation of exposed photographic film is important in a printer or copier. To obtain properly oriented paper prints of exposed photographic film, it is necessary for the emulsion side of the film to be correctly positioned in the optical path of the printer. This can be accomplished by reading letters or numbers which are imaged on a margin of the film. However, this procedure can present problems, particularly in so-called mini-labs, because mini-labs are normally designed such that the entire printing process from insertion of the film to delivery of the paper prints is fully automated thereby allowing personnel with relatively little training to be employed. Accordingly, a method for automatically determining the orientation of an inserted film is desired.

The German Offenlegungsschrift 36 35 386 discloses a method in which a light beam is directed onto either side of a film and the relative amount of scattered light and reflected light is measured. It is assumed here that the emulsion side has a higher proportion of scattered light. However, this method could not be applied up to the present due to a lack of precision.

SUMMARY OF THE INVENTION

It is an object of the invention to provide a method which allows the orientation of a length of photosensitive material to be determined with a higher degree of reliability.

Another object of the invention is to provide a method which makes it possible to determine the orientation of a length of photosensitive material relatively economically.

A further object of the invention is to provide an apparatus which enables the orientation of a length of photosensitive material to be determined with increased reliability.

An additional object of the invention is to provide an apparatus which permits the orientation of a length of photosensitive material to be determined relatively economically.

The preceding objects, as well as others which will become apparent as the description proceeds, are achieved by the invention.

One aspect of the invention resides in a method of determining the orientation of a length of exposed photosensitive material, e.g., photographic film, which is provided with a pattern having a first portion and a second portion different from the first portion. The pattern may, for instance, include a timing track having three portions, namely, a begin mark, a finish mark different from the begin mark, and a regular light/dark grating, i.e., a grating made up of alternating light and dark bars or segments of uniform width, between the begin and finish marks. The begin and finish marks are preferably each constituted by a single light or dark segment having respective widths which differs from one another as well as from the width of the grating segments. The method comprises the steps of sensing the photosensitive length to detect the pattern; and establishing the position of the first portion of the pattern relative to the second portion.

The method of the invention is particularly well-suited for determining the orientation of a length of exposed photosensitive material in a copier or printer.

The establishing step may further include determining the position of the pattern. When the photosensitive length has two longitudinal marginal portions and the pattern is located on one such marginal portion, the sensing step includes sensing both of the marginal portions while the establishing step involves determining on which side of the photosensitive length the pattern, or the marginal portion with the pattern, is located.

The method may further comprise the step of conveying the photosensitive length in a predetermined direction during the sensing step, and the establishing step then includes determining whether the first portion of the pattern leads or lags the second portion.

The establishing step may additionally comprise generating data in response to detection of the segments making up the pattern, and storing the data in a memory having a plurality of memory units. The operation of storing the data may include producing a variable data set in the memory by entering first data in a first memory unit in response to detection of a first segment of the pattern, entering second data in the first memory unit in response to detection of a second segment, and shifting the first data to a second memory unit. By way of example, the first and second data may each include the size of the respective segment as well as the character of the segment, i.e., whether the segment is light or dark.

The entering of data in the first memory unit may be repeated in response to detection of each additional segment of the pattern. The establishing step may here comprise comparing the variable data set in the memory with a reference data set following data entry for each additional segment. The method may include the step of issuing a warning, e.g., a signal, when the variable data set matches the reference data set.

The establishing step may further comprise comparing the variable data set with an additional reference data set. The method can then include the additional steps of generating orientative data for the photosensitive length when the variable data set matches one of the reference data sets, and processing such orientative data.

Another aspect of the invention resides in an apparatus for determining the orientation of a length of exposed photosensitive material, particularly photographic film, which is provided with a pattern having a first portion and a second portion different from the first portion. The apparatus, which can advantageously constitute part of a printer or copier, comprises means for sensing the photosensitive length to detect the pattern; and means for establishing the position of the first portion of the pattern relative to the second portion upon detection of the pattern by the sensing means.

The apparatus may further comprise means for guiding the photosensitive length along a predetermined path, and the guiding means may include means for conveying the photosensitive length in a predetermined direction The establishing means may include means for determining the position of the pattern. When the pattern is located on one of the two longitudinal marginal portions of the photosensitive length, the sensing means may comprise a sensing device at each of two transversely spaced locations of the guiding means or predetermined path. These locations, together with their sensing devices, register with the respective marginal portions of the photosensitive length when the latter is in the path. The establishing means then includes means for determining to which side of the path the pattern is located. The establishing means may also include means for determining whether the first portion of the pattern leads or lags the second portion.

The establishing means may comprise means for generating data in response to detection of the segments of the pattern, and at least one shift register for storing the data from successively detected segments in succession. The generating means is preferably operative to generate data denoting the size of each segment as well as the nature of the segment, i.e., whether the segment is light or dark. Upon detection of the first segment, data relating to this segment are stored in a first memory cell or unit of the shift register. As soon as another segment is detected, the data for the first segment are shifted into the next memory cell while the data for the newly detected segment are loaded into the first memory cell. Thus, whenever a segment is detected, data for such segment are entered in the first memory cell and stored data for any previously detected segment are shifted to the next memory cell. If the shift register has five memory cells, for example, the data for the first detected segment are erased in response to detection of the sixth segment. It is of advantage for a shift register to be provided for each side of the guiding means, that is, for each of the sensors.

In order to positively identify the pattern and to be able to establish the relative position of the first and second portions of the pattern, e.g., the relative position of the light/dark grating to either the begin mark or the end mark, it is necessary for a shift register to include at least three memory cells. However, accuracy and reliability increase with increasing number of memory cells.

In accordance with a first embodiment of the invention, the establishing means further comprises a reference memory or source of reference data for each of the shift registers, i.e., each of the shift registers is associated with a reference memory. The establishing means also comprises a comparator for each combination of shift register and reference memory, and such comparator functions to compare the data entered in a shift memory with reference data stored in the respective reference memory. The reference data contained in a reference memory corresponds to the data which would be generated by the pattern if the photosensitive length were inserted in the apparatus in an incorrect orientation. The reference data is compared with that in the respective shift register following each entry of data in the latter. If the data in the shift register match the reference data, a warning, e.g., in the form of a warning signal, is generated. To this end, the apparatus is provided with means for issuing a warning when the data in a shift register match the reference data.

According to a second embodiment of the invention, the establishing means comprises an additional memory, or additional source of additional reference data, for each shift register, i.e., each shift register is associated with two reference memories. The comparator for each combination of shift register and two reference memories is here operative to compare the data in a shift register with the reference data from both such reference memories. One of the reference memories in each combination contains reference data corresponding to the data which would be generated by the pattern if the photosensitive length were inserted in the apparatus properly. The other reference memory contains reference data corresponding to the data which would be generated by the pattern if the photosensitive length were placed in the apparatus with the emulsion side improperly oriented. This particularly advantageous embodiment of the invention makes it possible to determine not only whether the emulsion side of the photosensitive length is correctly oriented but also whether the latter was inserted in the apparatus with its first or last exposure at the leading end.

The comparator for each combination of shift register and two reference memories may be operative to generate orientative data for the photosensitive length when the data in the shift register matches the reference data from one of the associated reference memories. The apparatus may then comprise means for processing the orientative data, e.g., to determine the orientation of the photosensitive length.

In accordance with the invention, the relative position of first and second portions of the pattern, and preferably the position of the light/dark grating relative to either the begin mark or the end mark, is used to determine the orientation of the photosensitive length. It is irrelevant whether the position of the begin mark relative to the light/dark grating or the position of the end mark relative to the light/dark grating is established. Both marks are very easily distinguishable from the light/dark grating of the pattern since they have a size at least three times that of the individual light and dark segments of the light/dark grating, i.e., the width of the end mark is three times that of the individual segments of the light/dark grating while the width of the begin mark is five times that of such segments. Moreover, the light/dark grating is very easy to recognize because it is completely regular or uniform. Accordingly, the grating will cause a sensor to generate the same output signals no matter which end it is read from and regardless of the direction of travel of the photosensitive length.

The novel features which are considered as characteristic of the invention are set forth in particular in the appended claims. The improved method of determining the orientation of a photosensitive length, as well as the construction and mode of operation of the improved apparatus for making such determination, will, however, be best understood upon perusal of the following detailed description of certain specific embodiments when read in conjunction with the accompanying drawings.

DESCRIPTION OF THE PREFERRED EMBODIMENTS

Figure 1:
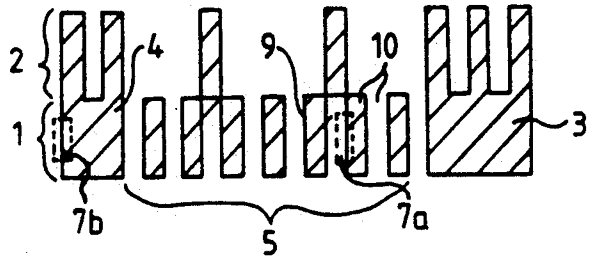
FIG. 1 shows a timing track and DX bar code of the type exposed on conventional films.
Figure 2:
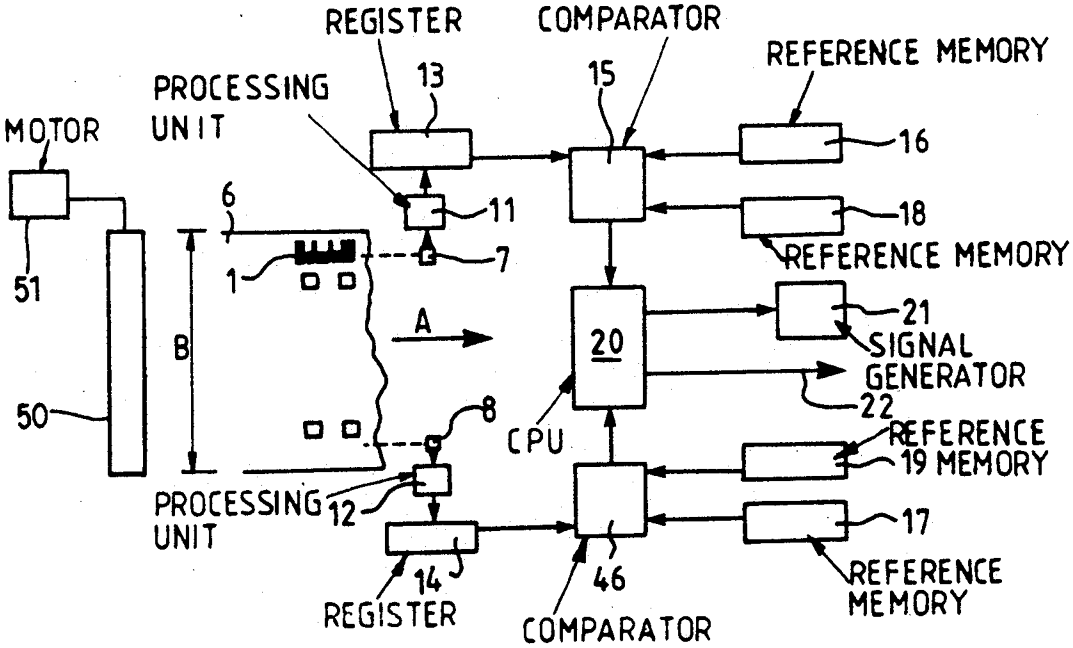
FIG. 2 is a block diagram of an apparatus in accordance with the invention for determining the orientation of an exposed photosensitive length.

Referring to FIGS. 1 and 2, an exposed photographic film or photosensitive length is identified by the reference numeral 6. The film 6 is here assumed to be a conventional, small format film. The film 6 has two transversely spaced rows of perforations and a longitudinal marginal portion or margin between each such row and a neighboring longitudinal edge of the film 6. A DX bar code 2 is exposed on one of the longitudinal margins of the film 6 and contains information, in coded form, on the type of film and its sensitivity. Adjacent to the DX bar code 2, and between the latter and the respective row of perforations, is a timing track or pattern 1. The timing track 1 comprises three portions, namely, a begin mark 3, an end mark 4 and a regular or uniform light/dark grating 5 intermediate the marks 3 and 4. The light/dark grating 5 is made up of alternating light and dark segments 10 having the same width while the begin mark 3 and end mark 4 each consist of a single light or dark segment 10. In the illustrated embodiment, the segments 10 constituting the marks 3 and 4 are dark. The segment 10 constituting the begin mark 3 has a width five times that of the segments 10 of the grating 5 whereas the segment 10 constituting the end mark 4 has a width three times that of the segments 10 of the grating 5. Since the grating 5 does not represent coded information, the structure of the grating 5 at the beginning and end thereof is the same and does not change over the entire length of the film 6. Therefore, it is exceedingly well-adapted for a determination of the orientation of the film 6.

FIG. 2 illustrates an apparatus for determining the orientation of the film 6. This apparatus is here assumed to constitute part of a copier or printer for making prints of the film 6 and functions to check that the film 6 is properly oriented for printing. The apparatus has a film guide, and the film 6 is manually placed in the film guide by an operator. The film guide includes a pair of rollers 50 driven by a motor 51, and the rollers 50 constitute a conveying means for transporting the film 6 along a predetermined path B in a predetermined direction A. Two sensors 7 and 8 are mounted at transversely spaced locations of the film guide and register with the longitudinal margins of the film 6 during transport of the latter along the path B. The sensors 7,8 are arranged in such a manner that one of the sensors 7,8 further registers with the timing track 1 regardless of how the film 6 is inserted in the film guide.

The sensors 7,8, which generate output signals, are coupled to processing units 11 and 12, respectively. The processing units 11,12 process the output signals of the sensors 7,8 in such a fashion that, at each light-to-dark or dark-to-light transition or boundary 9 between two neighboring segments 10, a data subset is generated. Each of these data subsets includes information about the width of the segment 10 immediately upstream of the respective boundary 9 and about the character or nature of such segment 10, that is, whether the segment 10 is light or dark. The data subsets generated by the processing unit 11 are entered in a shift register 13 while the data subsets generated by the processing unit 12 are entered in a shift register 14. The first data subset is entered in the first memory cell or unit of the respective shift register 13 or 14. As soon as the second data subset is generated, the first data subset is shifted to the second memory cell and the second data subset is entered in the first memory cell. The first data subset is thus progressively shifted towards the last memory cell of the respective shift register 13 or 14. Once the first data subset has reached the last memory cell, it is erased upon entry of a new data subset in the shift register 13 or 14.

The data subsets in a shift register 13 or 14 together constitute an instantaneous data set. Whenever a new data subset is entered in the shift register 13, a comparator 15 in the form of a logic circuit compares the instantaneous data subset in the shift register 13 with a first reference data set stored in a first reference memory 16 and a second reference data set stored in a second reference memory 18. Similarly, upon entry of a new data subset in the shift register 14, a comparator 46 in the form of a logic circuit compares the instantaneous data set in the shift register 14 with a first reference data set stored in a first reference memory 17 and a second reference data set stored in a second reference memory 19. As soon as a match occurs, the comparator 15 or 46 transmits orientative data to a central processing unit 20 which can be in the form of a logic circuit. The orientative data inform the central processing unit 20 as to whether the instantaneous data set in the shift register 13 or 14 matches the first reference data set in the first reference memory 16 or 17, or matches the second reference data set in the second reference memory 18 or 19. The orientative data also indicate to the central processing unit 20 whether the timing track 1 was detected by the sensor 7 or by the sensor 8. Based on this information, the central processing unit 20 calculates the orientation of the film 6. If the film 6 was inserted in the film guide with an orientation such that the film 6 cannot be further processed, a warning signal is generated by a signal generator 21 in order to advise the operator that the film 6 should be removed and reinserted properly.

Processing arrangements capable of processing the film 6 in any orientation are known. Such arrangements receive information on the orientation of the film 6 via a conductor 22.

Figure 3A:
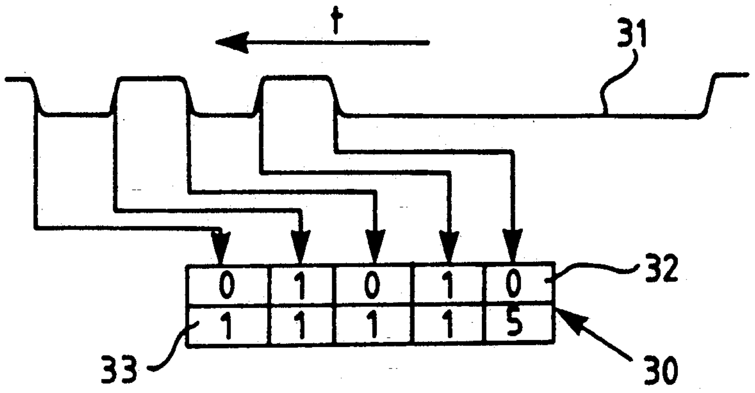
FIGS. 3_a_-3_d_ illustrates the output signals of a sensor during scanning of the timing track of FIG. 1 together with the data which is entered in a register in response to the output signals and together with reference data stored in a reference memory.

Assume that the reference memory 16 contains a reference data set 30 as shown in FIG. 3*a* and that the small format film 6 of FIG. 2 is placed in the film guide so that its first exposure is at the leading end of the film 6, i.e., so that its first exposure enters the apparatus first, and its emulsion side is oriented correctly. When the film 6 has travelled so far in the direction A that the position of the sensor 7 relative to the timing track 1 is as indicated at 7*a* in FIG. 1, the reference data set 30 also appears in the shift register 13. Thus, in this relative position, the sensor 7 has detected the wide segment 10 constituting the begin mark 3 and the four narrow segments 10 which are located immediately downstream of the begin mark 3 and constitute part of the grating 5. The corresponding output signal of the sensor 7 is illustrated at 31 in FIG. 3*a*. The data set 30 is made up of five data subsets which are arranged in columns and form two rows of digits 32 and 33. The first row 32 indicates whether the respective detected segment 10 is light or dark. Here, the digit "0" represents a dark segment 10 while the digit "1" represents a light segment 10. The second row of digits 33 denotes the width of the respective detected segment 10. The association between the digit representing the character of a detected segment 10, i.e., whether the segment 10 is light or dark, and the digit representing the width of the respective segment 10 can be made by means of the drive 50,51 for the film 6 or, where the film 6 is driven at constant speed, directly via time.

When the comparator 15 establishes that a match exists between the data sets in the shift register 13 and the reference memory 16, the central processing unit 20 uses this information, as well as the additional information that the timing track 1 was read by the sensor 7, to calculate that the film 6 was inserted in the film guide with its emulsion side in the proper orientation and with its first exposure leading.

Figure 3B:
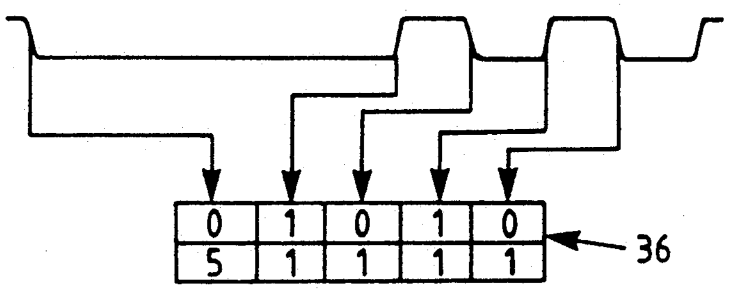
Figure 3C:
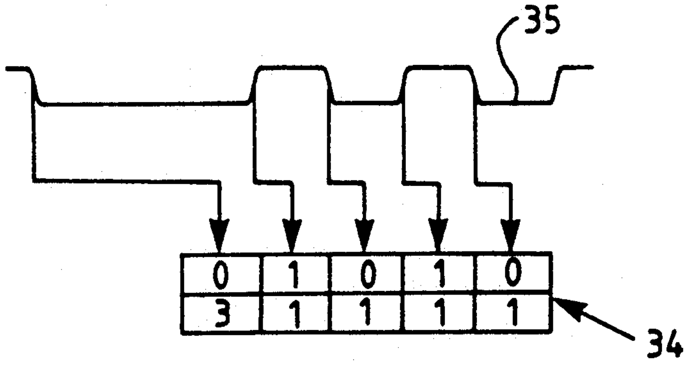

The same result can be achieved when a reference data set such as that indicated at 34 in FIG. 3*c* is stored in the reference memory 16. While the reference data set 30 of FIG. 3*a* denotes the relative position of the begin mark 3 and the regular light/dark grating 5, the reference data set 34 of FIG. 3*c* denotes the relative position of the grating 5 and the end mark 4.

Referring to FIGS. 1 and 3*c*, when the film 6 has travelled so far in the direction A that the sensor 7 assumes the position 7*b* of FIG. 1 relative to the timing track 1, the reference data set 34 also appears in the shift register 13. Thus, in this relative position, the sensor 7 has detected the final four narrow segments 10 of the grating 5 and the wider segment 10 which constitutes the end mark 4 and is disposed immediately downstream of the grating 5. The corresponding output signal of the sensor 7 is indicated at 35 in FIG. 3*c*. The central processing unit 20 here arrives at the same conclusion as in the case of the reference data set 30 of FIG. 3*a*.

Assume once more that, as described with reference to the data set 30 of FIG. 3*a*, the orientation of the film 6 is to be determined using only the begin mark 3 and the regular light/dark grating 5. The reference data set 30 of FIG. 3*a* is then loaded in the reference memories 16 and 19 while a data set 36 illustrated in FIG. 3*b* is loaded in the reference memories 17 and 18. It will be observed that the reference data set 30 corresponds to the data set which would be obtained if the timing track 1 travelled so that the begin mark 3 led the grating 5 whereas the data set 36 corresponds to the data set which would be obtained if the timing track 1 travelled so that the begin mark 3 trailed the grating 5.

If the film 6 is now transported past the sensors 7,8, the following matches are possible between an instantaneous data set in the shift register 13 and the reference data sets 30,36 in the corresponding reference memories 16,18, and between an instantaneous data set in the shift register 14 and the reference data sets 30,36 in the corresponding reference memories 17,19:

a) Instantaneous data set in shift register 13 matches reference data set 30 in reference memory 16:

The film 6 was placed in the film guide with the emulsion side properly oriented and the first exposure at the leading end.

b) Instantaneous data set in shift register 13 matches reference data set 36 in reference memory 18:

The film 6 was placed in the film guide with the emulsion side improperly oriented and the last exposure at the leading end.

c) Instantaneous data set in shift register 14 matches reference data set 36 in reference memory 17:

The film 6 was placed in the film guide with the emulsion side properly oriented and the last exposure at the leading end.

d) Instantaneous data set in shift register 14 matches reference data set 30 in reference memory 19:

The film was placed in the film guide with the emulsion side improperly oriented and the first exposure at the trailing end.

The reaction of the central processing unit 20 to a match is a function of the design of the processing arrangement, e.g., copier or printer, which is associated with the apparatus of the invention and serves to further process the film 6. If such processing arrangement, which is not illustrated in the drawings, can process the film 6 only when the emulsion side is properly oriented and the first exposure is at the leading end, i.e., enters the processing arrangement first, the signal generator 21 issues a warning signal in cases (b), (c) and (d) above. On the other hand, if the processing arrangement is capable of processing the film 6 only with the emulsion side in the proper orientation but with either the first exposure or the last exposure at the leading end, a warning signal is generated in cases (b) and (d) only. Moreover, printers exist in which each individual exposure of a film is scanned, the resulting signals are stored in digital form and images of the exposures are printed on photosensitive paper pointwise, e.g., by means of a cathode ray tube. In printers of this type, the orientation of the film upon insertion is irrelevant because it is possible, by appropriately processing the stored signals, to invert the images of the exposures electronically so that the images are printed on the photosensitive paper in the correct orientation. The printer need only be supplied with information on the orientation of the film upon entering the printer. This information is sent to the printer via the data conductor 22.

Figure 3D:
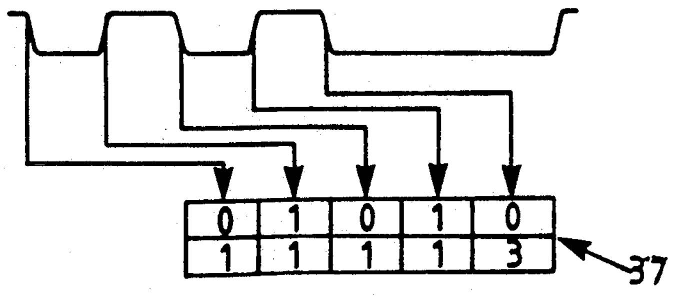

As indicated previously, it is possible to determine the orientation of the film 6 using the end mark 4 and the regular light/dark grating 5 of the timing track 1 instead of the begin mark 3 and the grating 5. In this case, the reference memories 16 and 19 are loaded with the reference data set 34 of FIG. 3*c* while the reference memories 17 and 18 are loaded with the reference data set 37 of FIG. 3*d*. It will be observed that the reference data set 34 corresponds to the data set which would be obtained if the timing track 1 travelled so that the grating 5 led the end mark 4 whereas the data set 37 corresponds to the data set which would be obtained if the timing track 1 travelled so that the grating 5 trailed the end mark 4. The procedure for determining the orientation of the film 6 using the end mark 4 and the grating 5 is similar to that described above for the begin mark 3 and the grating 5 so that no further explanation is required here.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

What is claimed is:

1. A method of determining the orientation, particularly in a printer, of a length of exposed photographic material which is provided with a pattern having a first end portion, a second end portion different from said first end portion and a substantially regular third portion between said end portions and differing therefrom, said method comprising the steps of sensing said length to detect said third portion and at least one of said end portions; and establishing the orientation of said length based exclusively on the position of said pattern and the position of said third portion relative to said one end portion.

2. The method of claim 1, wherein said length has a pair of longitudinal marginal portions and said pattern is located on one of said marginal portions, the sensing step including sensing both of said marginal portions, and the establishing step including determining on which side of said length said one marginal portion is located.

3. The method of claim 1, further comprising the step of conveying said length in a predetermined direction during the sensing step, the establishing step including determining whether said third portion leads or lags said one end portion.

4. The method of claim 1, wherein said pattern is a timing track.

5. The method of claim 1, wherein said third portion comprises a substantially regular array of alternating light and dark segments.

6. The method of claim 1, wherein said third portion and one end portion include alternating light and dark segments and the establishing step comprises generating data in response to detection of said segments, and storing said data in a memory having a plurality of memory units, said storing including producing a variable data set in said memory by entering first data in a first memory unit in response to detection of a first segment, entering second data in said first memory unit in response to detection of a second segment, and shifting said first data to a second memory unit.

7. An apparatus for determining the orientation of a length of exposed photographic material which is provided with a pattern having a first end portion, a second end portion different from the first end portion and a substantially regular third portion between the first and second end portions and differing therefrom, said apparatus comprising means for sensing the length to detect the third portion and at least one of the end portions; and means for establishing the orientation of the length based exclusively on the position of the pattern and the position of the third portion relative to the one end portion.

8. The apparatus of claim 7, wherein the length has a pair of longitudinal marginal portions and the pattern is located on one of the marginal portions; and further comprising means for guiding the length along a predetermined path having a pair of transversely spaced locations which respectively register with the marginal portions of the length when the latter is in said path, said sensing means including a sensing device at each of said locations, and said establishing means including means for determining to which side of said path the pattern is located.

9. The apparatus of claim 7, further comprising means for conveying the length in a predetermined direction, said establishing, means including means for determining whether the third portion leads or lags the one end portion.

10. A method of determining the orientation, particularly in a printer, of a length of exposed photographic material which is provided with a pattern having a first portion and a geometrical second portion different from said first portion, said first and second portions including alternating light and dark segments, and said method comprising the steps of sensing said length to detect said pattern; and establishing the position of said pattern and the position of said first portion relative to said second portion, the establishing step comprising generating data in response to detection of said segments, and storing said data in a memory having a plurality of memory units, said storing including producing a variable data set in said memory by entering first data in a first memory unit in response to detection of a first segment, entering second data in said first memory unit in response to detection of a second segment, and shifting said first data to a second memory unit, said first and second data each including the character and size of the respective segment.

11. A method of determining the orientation, particularly in a printer, of a length of exposed photographic material which is provided with a pattern having a first portion and a geometrical second portion different from said first portion, said first and second portions including alternating light and dark segments, and said method comprising the steps of sensing said length to detect said pattern; and establishing the position of said pattern and the position of said first portion relative to said second portion, the establishing step comprising generating data in response to detection of said segments, and storing said data in a memory having a plurality of memory units, said storing including producing a variable data set in said memory by entering first data in a first memory unit in response to detection of a first segment, entering second data in said first memory unit in response to detection of a second segment, sand shifting said first data to a second memory unit, the entering of data in said first memory unit being repeated in response to detection of each additional segment, and the establishing step further comprising comparing said variable data set with at least one reference data set following data entry for each additional segment.

12. An apparatus for determining the orientation of a length of exposed photographic material which is provided with a pattern having a first portion and a geometrical second portion different from the first portion, the first and second portions of the pattern including alternating light and dark segments, and said apparatus comprising means for sensing the length to detect the pattern; and means for establishing the position of the pattern and the position of the first portion relative to the second portion upon detection of the pattern by said sensing means, said establishing means comprising means for generating data in response to detection of the segments, and at least one shift register for storing the data from successively detected segments in succession.

13. The method of claim 11, further comprising the step of issuing a warning when said variable data set matches said reference data set.

14. The method of claim 11, wherein the establishing step comprises comparing said variable data set with an additional reference data set.

15. The method of claim 14, further comprising the steps of generating orientative data for said length when said variable data set matches one of said reference data sets, and processing said orientative data.

16. The apparatus of claim 12, wherein said generating means is operative to generate data denoting the character and size of each segment.

17. The apparatus of claim 12, wherein said one shift register includes at least three memory units.

18. The apparatus of claim 12, wherein said establishing means further comprises at least one source of reference data, and means for comparing the data in said one shift register with said reference data.

19. The apparatus of claim 18, further comprising means for issuing a warning when the data in said one shift register matches said reference data.

20. The apparatus of claim 18, wherein said establishing means comprises an additional source of additional reference data, said comparing means being operative to compare the data in said one shift register with said additional reference data.

21. The apparatus of claim 20, wherein said comparing means is operative to generate orientative data for the length when the data in said one shift register matches the reference data from one of said sources; and further comprising means for processing said orientative data.

22. The apparatus of claim 12, further comprising means for conveying the length along a predetermined path having a pair of transversely spaced locations, said sensing means including a first sensing device at one of said locations and a second sensing device at the other of said locations, and said first sensing device being coupled to said one shift register, said establishing means comprising an additional shift register for storing data from successively detected segments in succession, and said second sensing device being coupled to said additional shift register.

23. The apparatus of claim 22, wherein said establishing means comprises a first source of reference data, a first comparator for comparing the data in said one shift register with the reference data in said first source, a second source of reference data, and a second comparator for comparing the data in said additional shift register with the reference data in said second source.

24. The apparatus of claim 23, wherein said establishing means comprises a first additional source of reference data which is coupled to said first comparator and a second additional source of reference data which is coupled to said second comparator.

* * * * *